G. P. Sweezy.
Tailor's Measure.
No. 89,091. Patented Apr. 20, 1869.
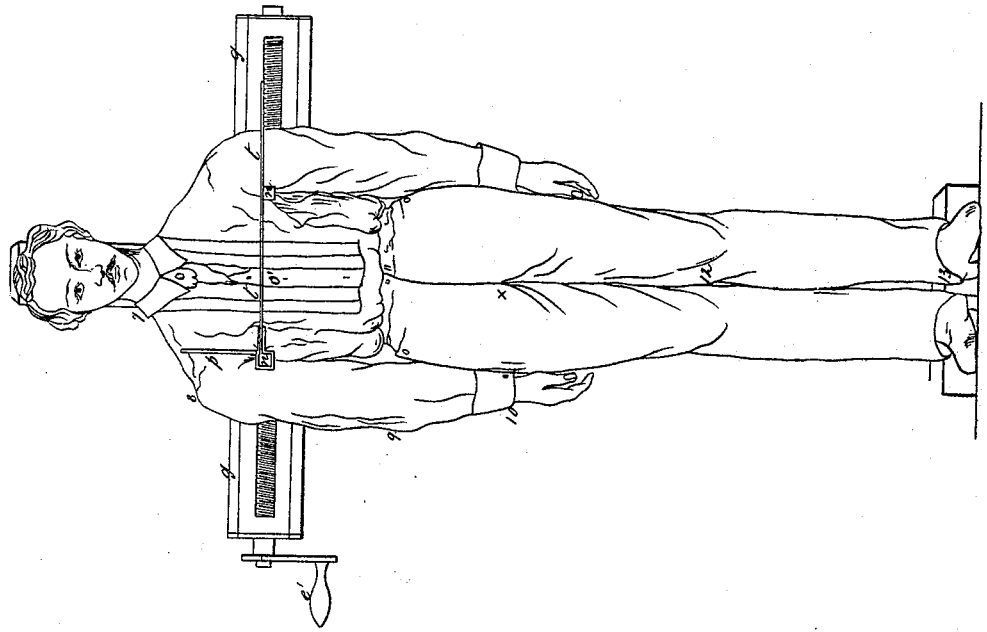
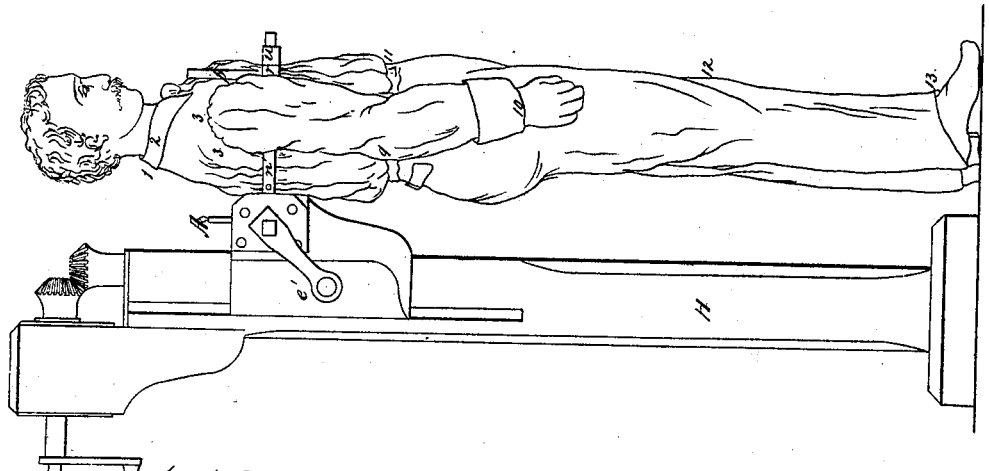
Witnesses
John L. Gardner
Alfred Wagstaff Jr.
Inventor
George P. Sweezy G. P. Sweezy.
Tailor's Measure.
No. 89,091. Patented Apr. 20, 1869.
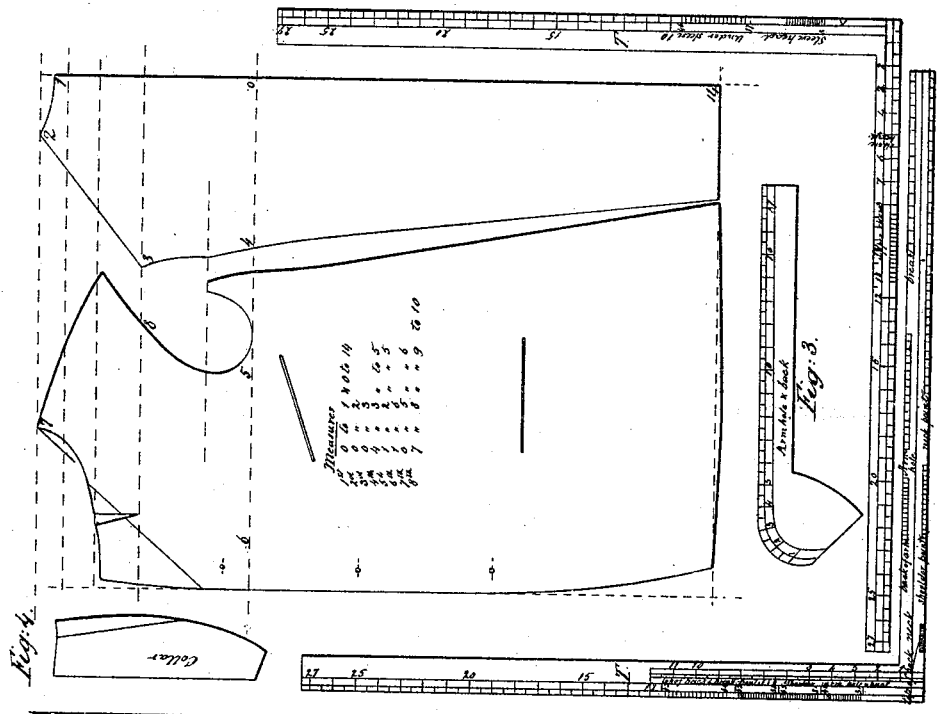
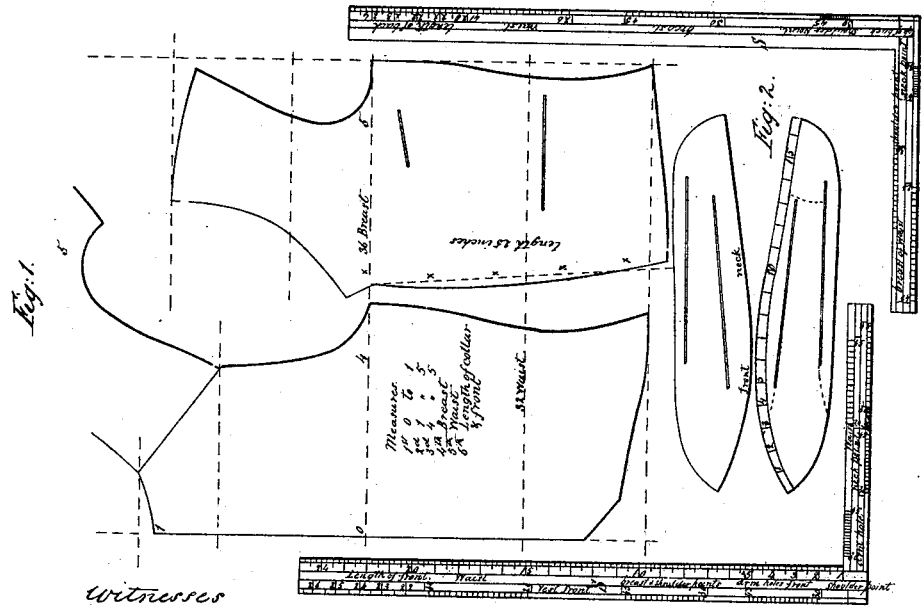

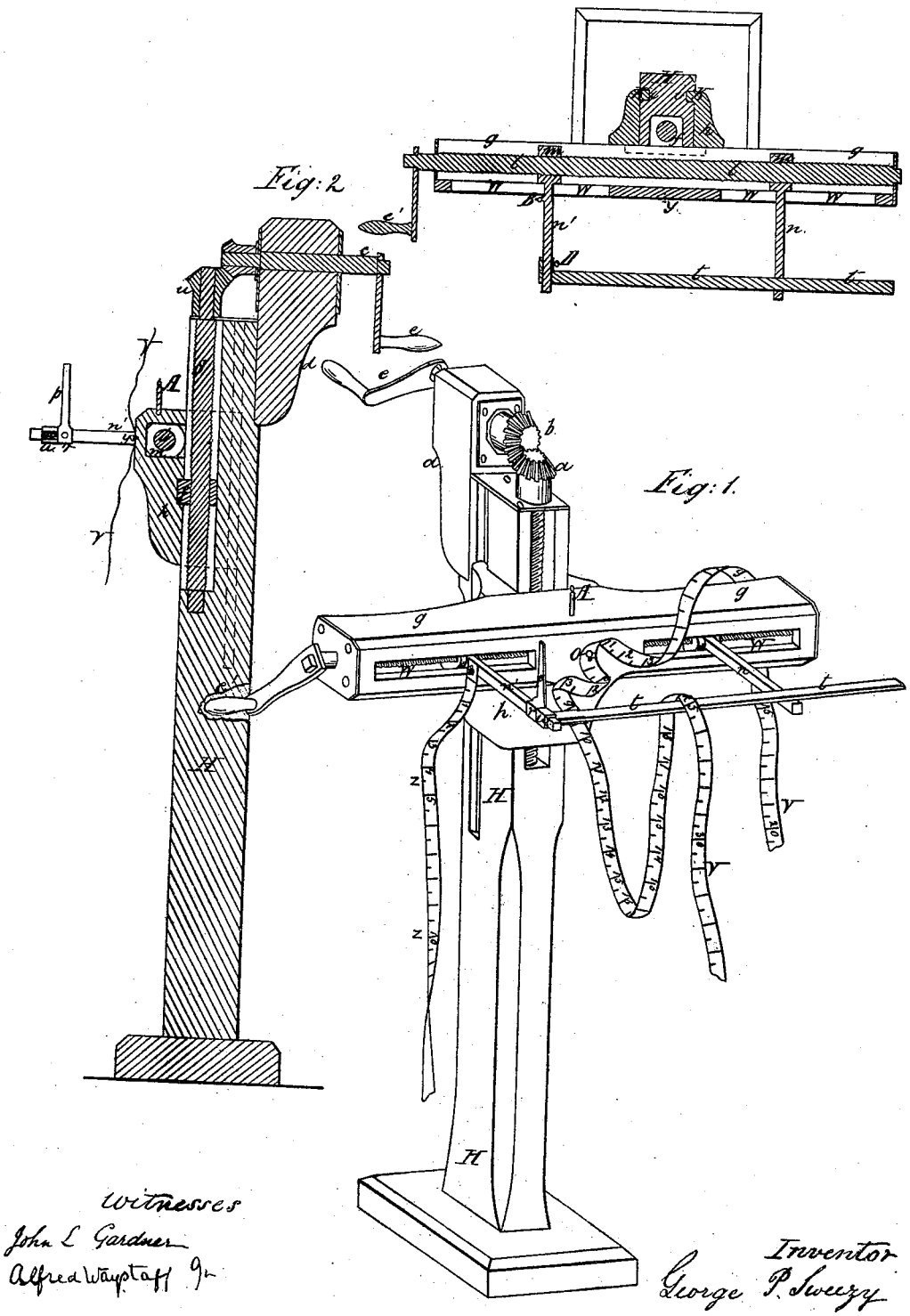

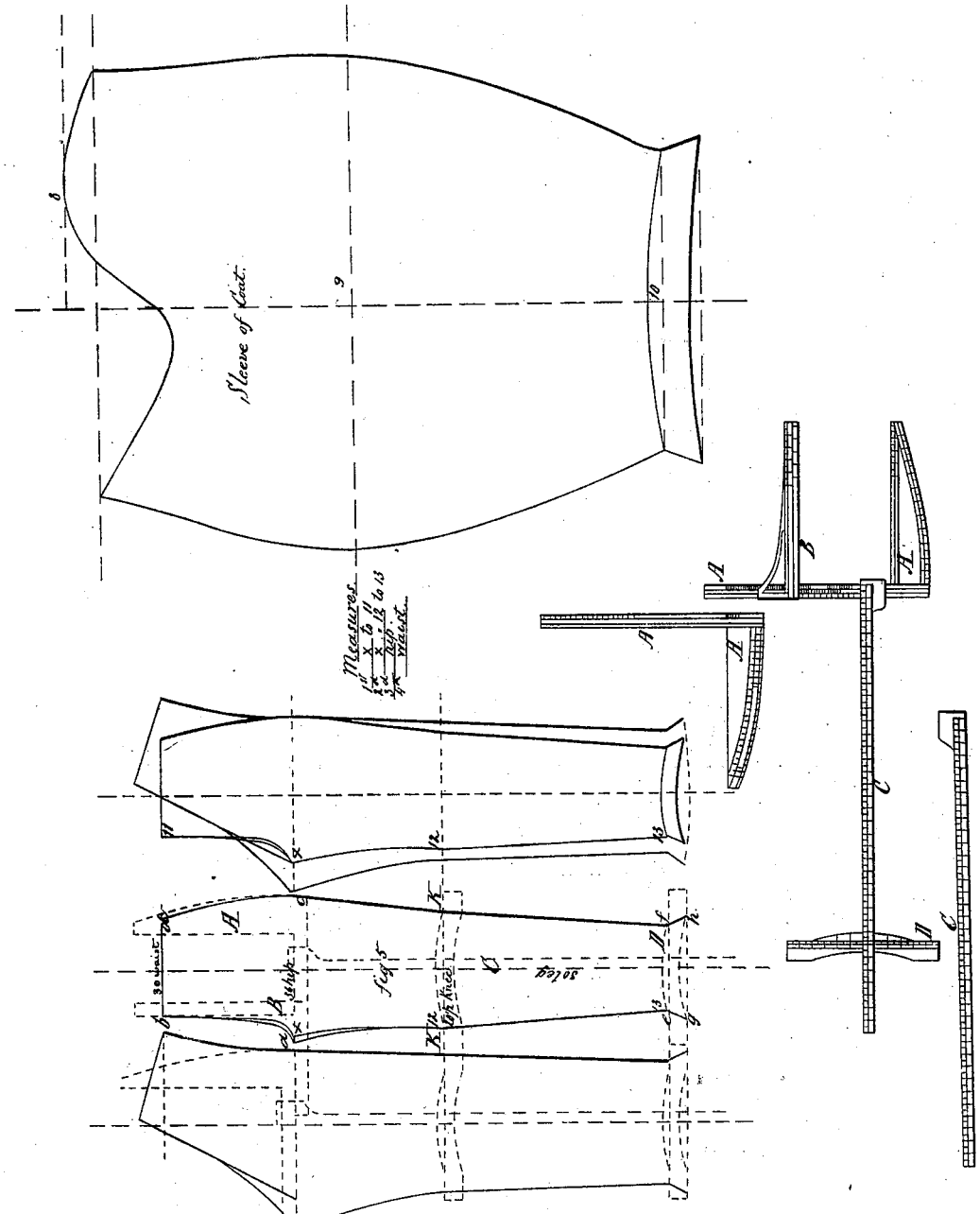

GEORGE P. SWEEZY, OF RIVERHEAD, NEW YORK.

Letters Patent No. 89,091, dated April 20, 1869.

IMPROVEMENT IN DEVICES FOR MEASURING, LAYING OUT, AND CUTTING GARMENTS.

The Schedule referred to in these Letters Patent and making part of the same.

*To all whom it may concern:*

Be it known that I, GEORGE P. SWEEZY, of Riverhead, in the county of Suffolk, and State of New York, have invented a new and useful Improvement in Devices for Measuring the Human Body, to Cut Garments therefor; and I do hereby declare the following to be a full, clear, and exact description of the same, reference being had to the accompanying drawings, making a part of this specification, in which—

Sheet 1, Figure 1, represents, in perspective, an apparatus for measuring the person for whom garments are to be cut;

Figure 2 represents a vertical section through the same; and

Figure 3 represents a horizontal section thereof.

Sheet 2 represents a side and front elevation of the measuring-apparatus, with the manner of applying it to the person to be measured.

Sheets 3 and 4 represent appliances for laying down the measures upon the material out of which the garments are to be cut and made, as well as the forms of the different parts thereof.

The drawings, on sheets 1 and 2, illustrate what I regard as constituting the substance of my invention, and those on sheets 3 and 4 represent the instruments for laying down the lines of measurement, or the manner of recording, or transferring these measurements from the person to the material.

The apparatus is composed of a vertical stem, or post, H, with a base, or foot-piece, upon which it stands, and which may be secured to the floor.

In this stem, or post, there is a screw, S, upon the top of which is secured a bevel-wheel, $a$, into which another bevel-wheel, $b$, on a shaft, $c$, that is turned by a crank, $e$, works, and thus turns said screw.

The screw S works through a nut, $f$, on the portion $h$, of the horizontal piece $g$ $g$, and this latter piece can be raised or lowered, at pleasure, by said screw.

Through the horizontal piece $g$ $g$ passes a screw, $l$, the threads of which, each side of its central portion, are reversed, and upon this screw-shaft there is a crank, by which it can be turned.

The screw-shaft $l$ works in two nuts, $m$ $m$, which are on the interior ends of the two projecting arms $n'$ $n$, so that the turning of the screw-shaft moves said arms simultaneously towards or from each other, as the case may be.

On one of these arms, $n'$, there is a vertical sliding piece, $p$, the duty of which is more distinctly shown in the figures of sheet 2.

A flat bar, $t$, having a socket at $u$, which slips over the arm $n'$, by which it is held there, extends to and lies upon the other arm, $n$, and these several arms, moving in parallel or right-angled planes, will accurately show the width or depth of the person, when measured by them.

At a central point, $o$, on the piece $g$, is fastened, permanently, a tape-measure, V V, divided into inches, and upon both sides of it, so that either or both ends of it may be used for measuring around the person, or parts of the person.

And another, though a movable tape-measure, Z, with a common division in inches, can be hooked to a pin, A, fig. 1, or on to either of the pins B or D, fig. 3, for measuring around such portions of the body as may be desired, and which measurements could not be had by the rigid arms which enclose the person.

In sheet 2 is shown, by a side and front view, the mode of applying this measuring-instrument to the person measured for the garment.

The width, depth, and position of the arms are all defined by the bars, or arms, and then by the tapes V Z all the other measurements can be taken.

For convenience of laying down the measurements of the person upon the material, I have prepared squares, with suitably marked scales upon them, representing the names of the portions of the body measured, as well as scaled patterns for drawing curved lines, but as these are simply the instruments for laying down upon the material the measurements taken by the apparatus from the person, they do not enter into the matters specifically claimed in this application.

I have shown also, by drawings, the mode of sketching out the lines, by the squares and other marked or subdivided instruments, but as this is but the result of the first measuring, laid down upon a map, as it were, and as a description of how this is done would be more in the nature of a treatise upon cutting out garments than of a specification for or of a patent, I do not further describe this marking-out process, the drawings being sufficient in detail for the purpose of explaining the objects of the measuring-apparatus.

On sheet 4, Figure 5, will be seen the measuring-device for pants, and the manner of applying the measure, and laying-off the cloth, the measurer consisting substantially of right-lined and curved line scales, with sliding-attachments.

Having thus fully described my invention,

What I claim therein as new, and desire to secure by Letters Patent, is—

In combination with the two arms $n'$ $n$, adjustable with the horizontal piece $g$, and capable of being moved toward or from each other simultaneously, and, by gearing the fixed or central measuring-tape V, as and for the purpose described and represented.

Also, in combination with the arms $n'$ $n$, adjustable vertically and horizontally, the arms $p$ and $t$, operating in connection with them, as and for the purpose set forth.

Also, in combination with the shifting-arms and the centrally-fixed measuring-tape V, the movable tape Z, for measuring from the three points A, B, and D, as shown and represented.

GEORGE P. SWEEZY.

Witnesses:
ALFRED WAGSTAFF, Jr.,
JOHN L. GARDINER.